United States Patent [19]

Van Cappel

[11] Patent Number: 5,036,498
[45] Date of Patent: Jul. 30, 1991

[54] METHOD FOR DETERMINING THE MOTION OF A TARGET IN UNDERWATER ACOUSTICS

[75] Inventor: Dominique Van Cappel, Villeneuve Loubet, France

[73] Assignee: Thomson-CSF, Puteaux, France

[21] Appl. No.: 524,804

[22] Filed: May 18, 1990

[30] Foreign Application Priority Data

May 22, 1989 [FR] France ................ 89 06662

[51] Int. Cl.$^5$ .............................. G01S 3/80
[52] U.S. Cl. ................... 367/125; 367/124; 367/118
[58] Field of Search ........... 367/118, 124, 125, 129; 364/561, 565

[56] References Cited

U.S. PATENT DOCUMENTS 4,162,474  7/1979  Broder et al. ............... 364/516

FOREIGN PATENT DOCUMENTS 288374  10/1988  European Pat. Off. .

OTHER PUBLICATIONS

Journal of the Acoustical Society of America, vol. 76, No. 4, Oct. 1984, pp. 1114–1122, Acoustical Society of America, New York, U.S.; F. Dommermuth et al.: "Estimating the trajectory of an accerlationless aircraft by means of a stationary acoustic sensor".
Journal of Acoustical Society of America, vol. 70, No. 4, Oct. 1981, pp. 1054–1061, New York, U.S.; J. C. Hassab et al.: "Estimation of location and motion parameters of a moving source observed from a linear array".

Primary Examiner—Daniel T. Pihulic
Attorney, Agent, or Firm—Oblon, Spivak, McClelland, Maier & Neustadt

[57] ABSTRACT

A method for determining the motion of a target in underwater acoustics by means of an antenna with misaligned sensors ($C_1$, $C_2^P$, $C_3$) provided with a central sensor $C_2^P$. It consists in estimating the characteristics of velocity ($V_x$, $V_y$) and position of the target $x(t^*)$, $y(t^*)$ relatively to the antenna by means of a likelihood maximum estimator taking account of the differences in propagation times measured between the wave fronts transmitted by the target and reaching the sensors. The motion estimator is initialized by means of an initial state vector X determined on the basis of the values of the azimuths of the target perceived from the mid-points of each pair of sensors, during a determined number of measurements staggered in time. The action of the state vector X takes place in taking account of the value of the elevation of the target with respect to the antenna.

4 Claims, 1 Drawing Sheet

METHOD FOR DETERMINING THE MOTION OF A TARGET IN UNDERWATER ACOUSTICS

BACKGROUND OF THE INVENTION

1. Field of the Invention

The present invention concerns a method for determining the motion of a target in underwater acoustics.

2. Description of the Prior Art

A known method in underwater acoustics to detect the position and motion of submerged targets uses a submerged movable antenna consisting, for example, of three sensors spatially separated from one another. This antenna makes it possible to measure the differences between the propagation times of a signal emitted by a moving target towards the different sensors. In most of the known devices, a description of which may be found in the article by J. C. HASSAB, B. GUIMOND, S. C. NARDONE, "Estimation Of Motion And Location Parameters Of A Moving Source Observed From A Linear Array" in the journal JASA 70(4), October 1981 or again in the IEEE communication by D. J. MURPHY, "Target Tracking With A Linear Array In An Underwater Environment", November 1981, the sensors are aligned and the intermediary sensor is placed strictly at mid-distance between the other two. However, in practice, this arrangement is difficult to meet and the faults in the alignment and position of the sensors introduce errors in the estimation of the positioning and motion of the targets.

SUMMARY OF THE INVENTION

It is an aim of the invention to overcome the above-mentioned drawbacks.

To this effect, an object of the invention is a method for determining the motion of a target in underwater acoustics by means of an antenna with misaligned sensors ($C_1$, $C_2^P$, $C_3$) provided with a central sensor $C_2^P$ of the type consisting in estimating the characteristics of velocity ($V_x$, $V_y$) and position of the target $x(t^*)$, $y(t^*)$ relatively to the antenna by means of a likelihood maximum estimator taking account of the differences in propagation times measured between the wave fronts transmitted by the target and reaching the sensors, said method consisting in the initializing of the motion estimator by means of an initial state vector X determined on the basis of the values of the azimuths of the target perceived from the mid-points of each pair of sensors, during a determined number of measurements staggered in time, and in estimating the state vector X in taking into account the value of the elevation of the target with respect to the antenna.

BRIEF DESCRIPTION OF THE DRAWINGS

Other characteristics and advantages of the invention will appear hereinafter from the following description, made with reference to the appended drawings, of which.

DETAILED DESCRIPTION OF THE INVENTION

Figure 1:
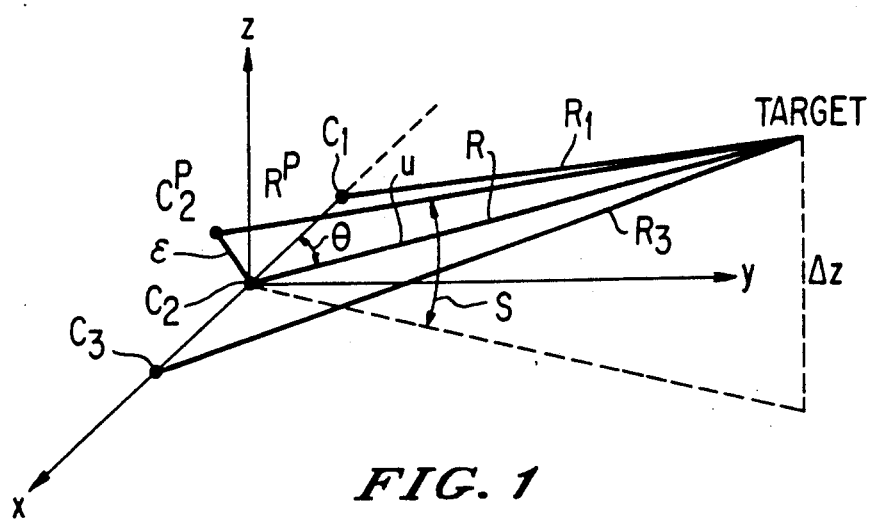
FIG. 1 shows the position of a target in relation, firstly, to an antenna formed by three aligned acoustic sensors and, secondly, to an antenna formed by three misaligned acoustic sensors.

In FIG. 1, the aligned antenna is represented by three sensors $C_1$, $C_2$ and $C_3$ and the misaligned antenna is shown by the sensors $C_1$, $C_2$ and $C_2$, the position of the sensor $C_2$ resulting from a translation of the central sensor $C_2$ of the aligned antenna along a vector of misalignment $\epsilon$ having its ends identical with the positions of the sensor $C_2$ and of the sensor $C_2^P$. According to this configuration, the vector $\epsilon$ may occupy any direction of the space around the ideal position of the sensor $C_2$, its modulus remaining relatively small compared with the distance L between two consecutive sensors $C_1$, $C_2$ or $C_2$, $C_3$ of the aligned antenna.

In considering only what happens with an aligned antenna, the distance R between the central sensor $C_2$ and the target and the relative bearing $\theta$ of the target with respect to the direction of alignment of the sensors $C_1$, $C_2$ and $C_3$ are obtained simply from the differences of propagation times $\tau_{12}$ and $\tau_{23}$ or time difference of each wave front coming from the target and reaching the sensors $C_1$–$C_2$ and $C_2$–$C_3$. These time differences are defined by the relationships:

$$\tau_{12} = \frac{R_1 - R}{c} \quad (1)$$

$$\tau_{23} = \frac{R - R_3}{c} \quad (2)$$

where $R_1$ and $R_3$ are the respective distances between the sensors $C_1$ and the target, and c is the velocity of propagation of sound in the medium in which the antenna is submerged. Taking only second order terms, $\theta$ and R are defined as a function of the differences in propagation times $\tau_{12}$ and $\tau_{23}$ by the relationships $$\cos\theta = \frac{-c(\tau_{12} + \tau_{23})}{2L} \quad (3)$$

$$\frac{1}{R} = \frac{c(\tau_{12} - \tau_{23})}{L^2 \sin^2\theta} \quad (4)$$

Naturally, in the presence of a misaligned antenna, the differences in propagation times obtained are no longer equal to the time differences $\tau_{12}$ and $\tau_{13}$. Taking only terms of the first order in $$\frac{||\epsilon||}{R},$$

the distance $R^P$ between the sensor $C_2^P$ and the target is then defined by an expression of the form:

$$R^P = R - <u,\epsilon> \quad (5)$$

where u represents the standardized vector of the direction of the target and $<,>$ symbolizes the scalar product.

The differences in propagation times $\tau_{12}^P$ and $\tau_{23}$ of the sound wave coming from the target between, respectively, sensors $C_1 - C_2^P$ and $C_2^P - C_3$ are defined by relationships of the form:

$$\tau_{12}^P = \tau_{12} + <u,\epsilon>/c \quad (6)$$

$$\tau_{23}^P = \tau_{23} - <u,\epsilon>/c \quad (7)$$

The relationships 6 and 7 show that the misalignment of the sensors on the antenna has an effect on the propagation times measured by the sensors and that, consequently, it should have an effect also on the computation of the position of the target. In particular, the appreciation of the distance R should be considered to be biased by the value:

$$\text{Bias}\left(\frac{1}{R}\right) = \frac{2\langle u,\epsilon\rangle}{L^2\sin^2\theta} \quad (8)$$

If both the alignment fault $\epsilon$ and the direction u are perfectly known, the biased value of the distance can be perfectly determined by the relationship 8.

However, in practice, only $\epsilon$ can be perfectly determined, and there always remains an error of appreciation of the direction u of the target.

If we consider an orthonormal reference (o, x, y, z), the relationship 8 should be considered as a resultant of the sum of a distance biased in the horizontal plane (o, x, y) and a distance biased in a vertical direction oz normal to this plane such that:

$$\text{Bias}\left(\frac{1}{R}\right) = \text{Bias}_1\left(\frac{1}{R}\right) + \text{Bias}_2\left(\frac{1}{R}\right) \quad (9)$$

$$\text{Bias}_1\left(\frac{1}{R}\right) = \frac{2}{L^2\sin^2\theta}(\delta u_x \epsilon_x + \delta u_y \epsilon_y) \quad (10)$$

$$\text{Bias}_2\left(\frac{1}{R}\right) = \frac{2}{L^2\sin^2\theta}\delta u_z \epsilon_z \quad (11)$$

When the target is localized in the horizontal plane, the components of the vector u in this plane $u_x$ and $u_y$ can be estimated properly. The errors $\delta u_x$ and $\delta u_y$ are very close to 0, and the bias on the distance is above all determined by the uncertainty on $\delta u_z$.

The Bias(R) is expressed as a function of the bias of 1 according to the relationship:

$$\text{Bias}(R) = \frac{-R^2\text{Bias}\left(\frac{1}{R}\right)}{1 + R\text{Bias}\left(\frac{1}{R}\right)} \quad (12)$$

$$\text{giving Bias}(R) = -\frac{\alpha}{1+\alpha}R \quad (13)$$

$$\text{with } \alpha = \frac{2\epsilon_z \Delta z}{L^2\sin^2\theta}$$

By way of indication, a vertical misalignment of 10 cm, for a target depth of 400 meters, may give rise to a bias on the distance of about 11%.

The result of the foregoing is that it is indispensable to take the depth of the target into account, to determine a precise tracking of these targets when the antennas used are not perfectly linear.

According to the invention, the depth of the target is either determined by a computation or, again, measured by a sonar antenna that is directional in elevation.

In the following computations, it is assumed that the target shifts at constant velocity V in a horizontal plane of submersion Z. According to the first method, the angle of elevation is estimated on the basis of all the measurements of the differences in the trajectory times.

The coordinates are all given in a geographic Cartesian reference system of any origin. The target is determined at each instant by a state vector X such that:

$$X = [x(t^*), y(t^*), V_x, V_y, S(t^*)]^T$$

where x(t*) and y(t*) define the components of distance of the vector in a horizontal plane and $V_x$ and $V_y$ determine its components of velocity in this same plane. This vector naturally relates to the instant of estimation t* and is used to reconstruct the trajectory $X_t$, $Y_t$ of the target by integration.

At any instant, the time difference between the sensors $C_k$ and $C_1$, for example, is determined by a relationship of the form:

$$\tau_{k1}(t) = \frac{R_k(t) - R_1(t)}{c} \quad (14)$$

The distance $R_{k(t)}$ between the target and the sensor $C_k$ is given by a relationship of the form:

$$R_k(t) = \sqrt{d_k(t)^2 + (z - C_{kz}(t))^2} \quad (15)$$

where $d_k$ which represents the horizontal distance of the target from the sensor, is defined by:

$$d_k(t)^2 = (x(t) - C_{kx}(t))^2 + (y(t) - C_{ky}(t))^2 \quad (16)$$

The submersion term is computed by making the submersion of the central sensor $C_2$ take place at the instant t. It is defined by the relationship:

$$\begin{aligned} z - C_{kz}(t) &= (z - C_{2z}(t^*)) + (C_{2z}(t^*) - C_{kz}(t)) \\ &= R_2(t^*)\sin S(t^*) + (C_{2z}(t^*) - C_{kz}(t)) \end{aligned} \quad (17)$$

The foregoing formulae (14) to (17) enable the prediction of the time differences $\tau(X)$ as a function of the state vector X to be estimated.

Figure 2:
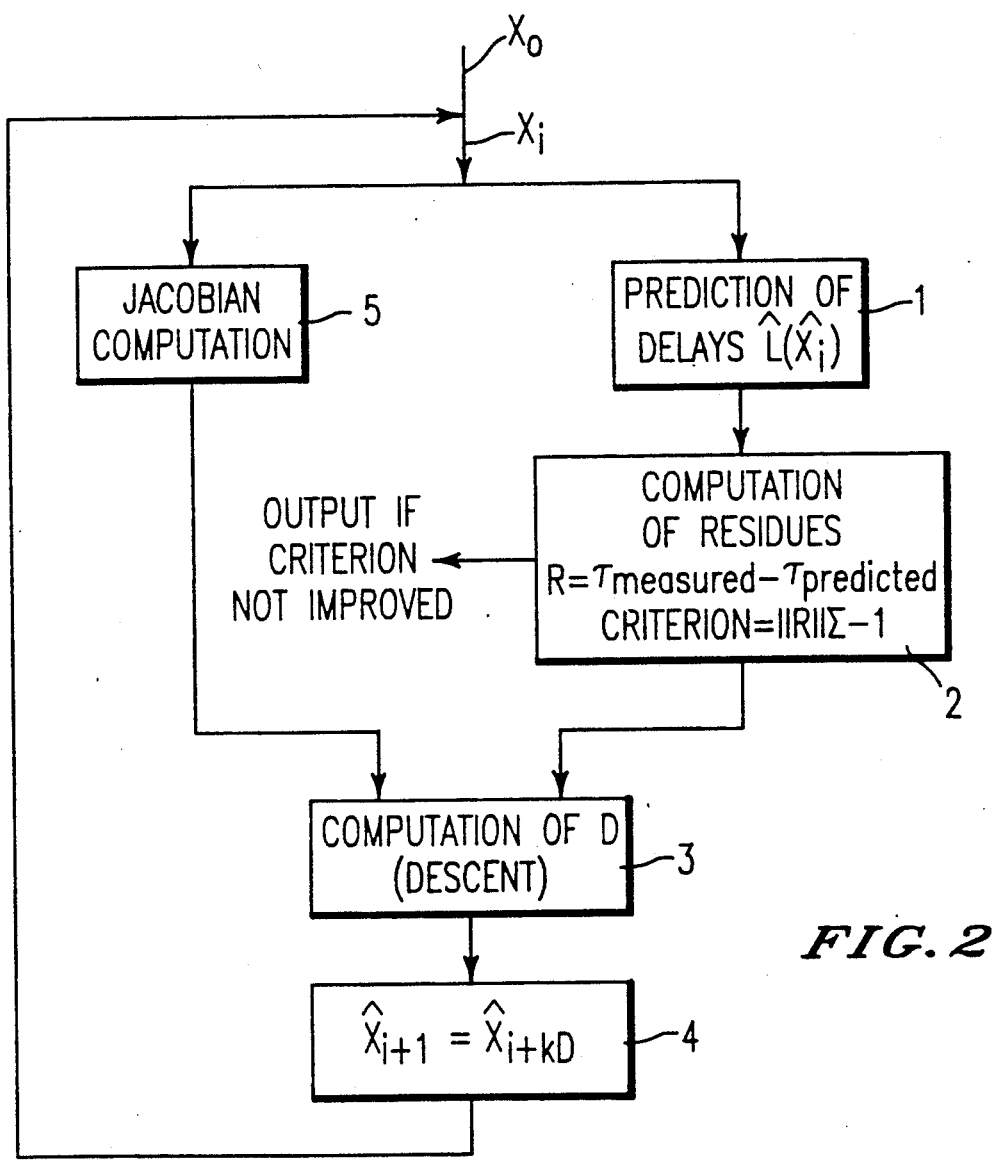
FIG. 2 shows a flow chart of the algorithm used.

The estimation algorithm is defined in the manner shown in FIG. 2. It consists, at the step 1, in making a prediction, by means of the relationships (14), of the time differences as a function of each state vector X and then in making a computation, at the step 2, of the residues of estimation between the values of time differences measured between each sensor and the predicted time differences. These computations use likelihood maximum and least square estimators in a known way. These likelihood maximum and least square estimators give an estimated value X of the state vector X when the values of the measured and predicted time differences $\tau(X)$ are minimum. This minimizing is achieved, for example, by using a known iterative algorithm of the GAUSS NEWTON type, shown in the steps 3 and 4.

According to this algorithm, the estimated value $X_{i+1}$ of the state vector obtained at the i+1th iteration is defined on the basis of the estimated value Xi obtained at the $i^{th}$ by a relationship of the form:

$$X_{i+1} = X_i + \mu D_i \quad (18)$$

where $D_i$ is a value of descent obtained by resolving a least squares problem which minimizes the criterion such that:

$$\underset{D}{\text{Min}} |J_i D - (\tau_m \cdot \tau(X_i))|_{\Sigma^{-1}} \tag{19}$$

where $J_i$ is the Jacobian matrix of the function $\tau(X)$ evaluated at each estimated vector $X_i$.

This matrix is computed at the step 5.

$\Gamma$ is a scalar between $-1$ and $+1$ chosen at each iteration so as to minimize the criterion. The iterations stop when the criterion no longer decreases significantly.

In the method that has just been described, the GAUSS NEWTON algorithm is initialized by a pseudo-linear estimator derived from the method of trajectography by azimuths described, for example, in S. C. NARDONE, A. G. LINDGREN and K. F. GONG, "Fundamental Properties and Performance of Conventional Bearings-Only Motion Analysis" in IEEE Transactions on Automatic Control, Vol. AC-29, No. 9, September 1984. This method consists, in a first step, in computing the value of the angle Ak made by the direction of a meridian of the terrestrial geoid with the half-line joining the middle of the space between the sensors $C_k$ and $C_l$ and the target.

This computation is done by applying the relationship:

$$A_{k1} = A\cos \frac{-c\tau_{k1}}{L_{k1}} + \text{Angle}(\text{Nord},[C_k, C_1]) \tag{20}$$

According to a second step, the value of the azimuth is put into an equation according to the relationship:

$$(\cos A_{k1} \; -\sin A_{k1} \; (t - t^*) \cos A_{k1} \; -(t - t^*) \sin A_{K1}) \begin{pmatrix} x(t^*) \\ y(t^*) \\ V_x \\ V_y \end{pmatrix} = \tag{21}$$

$$I_{k1x}\cos A_{k1} - I_{k1y}\sin A_{k1}$$

And, finally, in a third step, the three pairs of sensors and the n measuring instants are considered to resolve a linear system obtained from the previous relationship, the resolution of which is done by the least squares method, weighted by $\Sigma^{-1}$.

This pseudo-linear estimation enables the initializing of the GAUSS-NEWTON algorithm in position and velocity, the initial elevation being arbitrarily chosen as zero.

The method that has just been described may also, if necessary, be adapted to the situations in which the elevation can be measured by an independent sonar antenna. For, if in addition to the antenna device that has just been described, a sonar, at each instant, delivers a measurement taken of the elevation of the target, it may be judicious to use these items of data to compute the trajectography of the target. In this case, the method of computation uses a method very similar to the previous one. In then referencing the elevation values in relation to the central sensor, the equation of prediction of the elevation values is then:

$$S(t) = A\sin \frac{R_2(t^*)\sin S(t^*) + C_{2z}(t^*) - C_{2z}(t)}{R_2(t)} \tag{18}$$
$$\tag{22}$$

The predicted elevations then have to be included in the vector of the time differences $\tau(X)$ while the elevations measured have to be included in the vector of time differences measured.

To initialize the GAUSS NEWTON algorithm, the elevation that is taken into account is equal to the mean of the elevation values obtained, giving:

$$S = \frac{1}{N} \sum_{1}^{N} S(t_i) \tag{23}$$

This elevation value is then taken into account for the computation of the azimuths according to the relationship:

$$A_{k1} = A\cos \frac{-c\tau_{k1}}{L_{k1}\cos S} + \text{Angle}(\text{Nord},[C_k, C_1]) \tag{24}$$

The implementation of the method of the invention could advantageously be done by means of one or more suitably programmed signal processing microprocessors. This implementation is within the scope of those skilled in the art.

What is claimed is:

1. A method for determining the motion of a target in underwater acoustics by means of an antenna with misaligned sensors ($C_1$, $C_2^P$, $C_3$) provided with a central sensor $C_2^P$, comprising the steps of:
   estimating the characteristics of velocity ($V_x$, $V_y$) and position of the target X ($t^*$), Y ($t^*$) relative to the antenna by means of a motion estimator;
   applying a GAUSS NEWTON iterative algorithm taking into account the differences in propagation times measured between fronts transmitted by the target and reaching the sensors, said method further comprising the steps of;
   initializing the GAUSS NEWTON algorithm of the motion estimator by means of an initial state vector X determined on the basis of the values of azimuths AKI of the target perceived from the mid-points of each pair of sensors, during a determined number of measurements staggered in time; and
   estimating the state vector X by taking into account the value of the elevation of the target with respect to the antenna, with the horizontal coordinates of the position of the target and its velocity vectors being determined for initializing the GAUSS NEWTON algorithm by resolving a system of equations determined for each sensor pair by the matrix relationship;

$$(\cos A_{k1} \; -\sin A_{k1} \; (t - t^*) \cos A_{k1} \; -(t - t^*) \sin A_{K1}) =$$

$$I_{kx} \cos A_{k1} - I_{kiy} \sin A_{k1}. \begin{pmatrix} x(t^*) \\ y(t^*) \\ V_x \\ V_y \end{pmatrix}$$

2. A method according to claim 1, wherein the value of the elevation is computed by making the submersion of the central sensor occur at the instant of estimation.

3. A method according to claim 2, wherein the value of the elevation is measured with an additional sonar antenna.

4. A method according to claim 3, wherein the GAUSS NEWTON algorithm is initialized by taking into account the mean of the elevations measured during a determined number N of measurements.

* * * * *